(12) United States Patent
Masa et al.

(10) Patent No.: US 8,472,106 B2
(45) Date of Patent: Jun. 25, 2013

(54) WAVELENGTH CONVERSION ELEMENT

(75) Inventors: Yoshihiko Masa, Tokyo (JP); Kiyoshi Shimamura, Ibaraki (JP); Villora Encarnacion Antonia Garcia, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 280 days.

(21) Appl. No.: 12/747,498

(22) PCT Filed: Dec. 12, 2008

(86) PCT No.: PCT/JP2008/072702
§ 371 (c)(1),
(2), (4) Date: Oct. 12, 2010

(87) PCT Pub. No.: WO2009/075363
PCT Pub. Date: Jun. 18, 2009

(65) Prior Publication Data
US 2011/0019266 A1 Jan. 27, 2011

(30) Foreign Application Priority Data
Dec. 12, 2007 (JP) ................. 2007-320441

(51) Int. Cl.
*G02F 1/35* (2006.01)
(52) U.S. Cl.
USPC ............... 359/326; 359/328; 372/21; 372/22
(58) Field of Classification Search
USPC ................................. 359/326, 328
See application file for complete search history.

(56) References Cited

U.S. PATENT DOCUMENTS

| | | | | |
|---|---|---|---|---|
| 6,879,615 | B2 * | 4/2005 | Henrichs | 372/45.01 |
| 6,986,693 | B2 * | 1/2006 | Chowdhury et al. | 445/49 |
| 7,099,073 | B2 * | 8/2006 | Chowdhury et al. | 359/332 |
| 7,920,766 | B2 * | 4/2011 | Blumberg et al. | 385/122 |
| 7,995,267 | B2 * | 8/2011 | Satoh et al. | 359/326 |
| 2011/0134509 | A1 * | 6/2011 | Satoh et al. | 359/326 |

FOREIGN PATENT DOCUMENTS

| | | |
|---|---|---|
| JP | 11-174506 A | 7/1999 |
| JP | 2002-122898 A | 4/2002 |
| JP | 2005-272219 A | 10/2005 |
| JP | 2005-275095 A | 10/2005 |
| JP | 2007-225528 A | 9/2007 |
| WO | 2004/083497 A1 | 9/2004 |

OTHER PUBLICATIONS

Taniyasu et al., "An aluminium nitride light-emitting diode with a wavelength of 210 nanometres", Nature, May 18, 2006, vol. 441, pp. 325-328. Mentioned on pp. 2 and 4 of as-filed specification.

(Continued)

*Primary Examiner* — Hemang Sanghavi
(74) *Attorney, Agent, or Firm* — Chen Yoshimura LLP

(57) ABSTRACT

A wavelength conversion element 20 has a periodic polarization reversal structure formed in a non-linear optical crystal, wherein positive/negative polarity is periodically alternated in period d expressed by the following formula (1), outputs light having frequency of 2ω from the incident light having frequency of ω, and is characterized in that the non-linear optical crystal is a nitride single crystal:

$$d = m\lambda/[2(n_{2\omega} - n_{\omega})] \quad (1)$$

where, m represents the order of phase matching, λ represents the wavelength of the incident light, $n_\omega$ represents the refractive index of the nitride single crystal such as AlN for the light having frequency of ω, and $n_{2\omega}$ represents the refractive index of the nitride single crystal such as AlN for the light having frequency of 2ω.

6 Claims, 4 Drawing Sheets

OTHER PUBLICATIONS

International Search Report (ISR) issued in PCT/JP2008/072702 for Examiner consideration, citing Foreign Patent Document Nos. 4-5 listed above.

Written Opinion (PCT/ISA/237) issued in PCT/JP2008/072702.

Japanese Office Action dated Nov. 6, 2012, in a counterpart Japanese patent application No. 2007-320441. (Concise Explanation of Relevance: the Japanese Office Action rejects claims in the Japanese application in view of Foreign Patent document No. 1, JP2005-275095, and JPH11-174506.).

* cited by examiner

High-voltage power supply

WAVELENGTH CONVERSION ELEMENT

TECHNICAL FIELD

The present invention relates to a wavelength conversion element usable as a deep ultraviolet light source having a wavelength ranging from 300 nm to 210 nm or as a vacuum ultraviolet light source having a wavelength of 200 nm or shorter. More specifically, the present invention relates to the improvement of the above-mentioned wavelength conversion element using quasi phase matching technology.

BACKGROUND ART

Application of short-wavelength lasers having a wavelength that falls within the deep ultraviolet range from 300 nm to 210 nm or vacuum ultraviolet range of 200 nm or shorter is expected to increase in various fields, including material processing, high-density optical recording, medical care, and sterilization, and as high-brightness white luminescent light sources. As laser sources having a wavelength that falls within these ranges, excimer lasers such as KrF (oscillation wavelength: 248 nm) and ArF (oscillation wavelength: 193 nm) are known. However, continuous wave oscillation is not allowed with these laser systems, and repetition frequency cannot be increased in pulse oscillation. Consequently, the energy per pulse increases, thus resulting in damage to optical components. Furthermore, since toxic fluoride gas is used, the laser systems require cumbersome maintenance, and consequently maintenance cost increases. In addition, these laser systems are large, and their laser beam quality is low. Due to those disadvantages, their application is limited, and that is why creation of downsized solid-state deep ultraviolet laser systems has been aspired.

Use of laser diodes has been studied to achieve downsized solid-state lasers. Deep-ultraviolet laser diodes using aluminum nitride (AlN), whose band gap is 6.4 eV, or mixed-crystal semiconductors consisting of aluminum nitride and gallium nitride (GaN), have been developed vigorously. However, they have problems that sufficient luminous efficiency cannot be obtained due to the problem of crystalline property and that the output is small (Non-patent Reference 1).

Meanwhile, as another method for achieving downsized solid-state laser systems, a solid-state laser is combined with a wavelength conversion element using a non-linear optical crystal to obtain coherent deep-ultraviolet light. Based on this combination, continuous wave oscillation is allowed in principle, and repetition frequency can also be increased in pulse oscillation. Furthermore, narrower bandwidth may also be allowed, and quality of mode in space is high.

The non-linear optical crystal is defined as a crystal having non-linear optical effect, namely the effect of non-linearity on the polarization response of materials. Specifically, the non-linear optical effect is defined as a phenomenon in which polarization response of a material, to which high-intensity light such as a laser beam is input, becomes disproportional to the electric field of the incident light, converting the wavelength of a part of the incident light. Second-harmonic generation for taking out light with a wavelength half that of an incident light using the second-order non-linear optical effect is best known as a method for converting laser wavelengths to shorter ones. According to this method, a Nd:YAG laser (wavelength: 1064 nm) can be converted into the one having the wavelength of 532 nm, which is then converted into the one with the wavelength of 266 nm by subjecting it to another wavelength conversion.

With this method, however, because of refractive index dispersion of the non-linear optical crystal to be performed wavelength conversion, the wavelength of the second harmonic within the crystal is not reduced precisely to the half of that of the incident light. Consequently, phase shift occurs between the second harmonic waves generated at various places within the crystal, which makes it difficult to obtain second harmonics having sufficient intensity. To solve this problem, phases are adjusted in general by using crystal orientation that allows the wavelength ratio of the incident light to that of the second harmonic to be precisely 2:1, utilizing the birefringence of the crystal.

However, in phase matching method using birefringence, it is impossible to make phase matching when it is exceeded the birefringence of the crystal. The quasi-phase matching method was proposed as a technique for matching the phases exceeding the limit of non-linear optical crystals (Patent Reference 1).

Quasi-phase matching can be achieved by periodically forming polarization reversal structures to a non-linear optical crystal. According to the quasi phase matching method, even if the non-linear optical crystal does not have appropriate birefringence at desired wavelength, the conversion efficiency can be improved by matching the phases of the fundamental wave and the second harmonic. Since the wavelength conversion based on quasi-phase matching does not use the birefringence of crystals, reduction in conversion efficiency resulting from different traveling directions of the fundamental wave and the second harmonic as well as degradation of beam quality can be prevented, which is an advantage of this method.

As wavelength conversion elements using the quasi-phase matching method, ferroelectric crystalline oxides such as $LiNbO_3$ and $LiTaO_3$ are known. Since the absorption edge of these ferroelectric crystalline oxides exists in proximity of the wavelength of 300 nm, the wavelengths usable in wavelength conversion elements using these crystals is limited to wavelengths of 300 nm or longer. Consequently, within the deep ultraviolet range from 300 nm to 210 nm, wavelength conversion using quasi-phase matching is not allowed. Furthermore, in practical wavelength conversion performed based on quasi-phase matching using $LiNbO_3$ and $LiTaO_3$, beam quality was found to have degraded within the wavelength range of 500 nm or shorter, 450 nm for example.

Against such technical background, a wavelength conversion element was proposed for generating deep ultraviolet rays with a wavelength of 300 nm or shorter, or vacuum ultraviolet rays with a wavelength of 200 nm or shorter, using a fluoride single crystal as the non-linear optical crystal, instead of $LiNbO_3$ and $LiTaO_3$ (Patent References 2 and 3).

Patent Reference 1: JP 2002-122898A (Claims, and a paragraph [0056])
Patent Reference 2: JP 2005-272219A (Claims)
Patent Reference 3: WO 2004/083497 (Claims)
Non-patent Reference 1: Y. Taniyasu, M. Kasu and T. Makimoto, Nature 441, 325 (2006)

DISCLOSURE OF THE INVENTION

Problems to be Solved by the Invention

In view of the above problems, the present invention intends to provide a wavelength conversion element based on quasi-phase matching capable of generating coherent light within the visible to deep-ultraviolet having wavelength from 500 nm to 200 nm using non-linear optical crystals other than the fluoride single crystal listed in Patent References 2 and 3.

Means for Solving the Problems

To solve the problems described above, the present inventor et al. studied crystalline materials capable of functioning as a wavelength conversion element within the above-mentioned wavelength range. Crystals usable as desired wavelength conversion elements are required to have the absorption edge wavelength of 300 nm or shorter, and to have ferroelectricity for employing quasi-phase matching technology. Furthermore, to actually manufacture a wavelength conversion element, a single crystal of a specified size or larger must be manufactured on condition that the above physical properties are satisfied.

As a material satisfying those conditions other than the fluoride single crystal, the present inventor et al. have found that a nitride single crystal is ideal, and successfully completed the present invention.

Accordingly, to solve the above problem, the object of the present invention is directed to provide a non-linear optical crystal, a periodic polarization reversal structure in which positive/negative polarity is alternated in period d found by equation (1) shown below, and is characterized in that the above non-linear optical crystal is a nitride single crystal in a wavelength conversion element that outputs light having frequency of 2ω from the incident light having frequency of ω using quasi-phase matching.

$$d = m\lambda / [2(n_{2\omega} - n_\omega)] \quad (1)$$

where, m represents the order of phase matching, λ represents the wavelength of the incident light, $n_\omega$ represents the refractive index of the nitride single crystal for the light having frequency of ω, and $n_{2\omega}$ represents the refractive index of the nitride single crystal for the light having frequency of 2ω.

Another modification of the present invention is characterized in that a periodic polarization reversal structure wherein positive/negative polarity is alternated in period d' found by equation (2) shown below is created in a non-linear optical crystal, and that the above non-linear optical crystal is a nitride single crystal in a wavelength conversion element that outputs light having frequency of ω3=ω1+ω2 by simultaneously inputting beams of light having frequency of ω1 and ω2 respectively using quasi-phase matching.

$$d' = m / [(n_3/\lambda 3) - (n_2/\lambda 2) - (n_1/\lambda 1)] \quad (2)$$

where, m represents the order of phase matching, λ1, λ2, and λ3 represent the wavelengths of the beams of light having frequency of ω1, ω2, and ω3 respectively, and $n_1$, $n_2$, and $n_3$ represent the refractive index of the nitride single crystal for the light having frequency of ω1, ω2, and ω3 respectively.

In the above configuration, the nitride single crystal may be a nitride expressed by a chemical formula $Al_{1-x}Ga_xN$ (0≦x≦1). The nitride single crystal may be AlN.

The nitride single crystal may be a bulk crystal, or a thin film formed on a substrate. The substrate on which the thin film is formed is preferably made of Si, GaAs, AlN, InP, AlGaN, $Al_2O_3$, or β-$Ga_2O_3$.

The nitride single crystal can be manufactured by the vapor phase growth method, liquid phase growth method, or solution growth method.

In the wavelength conversion element, at least one of the beams of light to be output after being performed to wavelength conversion has a wavelength of 500 nm or shorter.

Effects of the Invention

According to the wavelength conversion element of the present invention carries out wavelength conversion within the visible to deep-ultraviolet wavelength range from 500 nm to 200 nm, utilizing the quasi-phase matching, and in particular, has the effect of achieving downsized solid-state deep-ultraviolet laser light sources.

DESCRIPTION OF CODES

Figure 1:
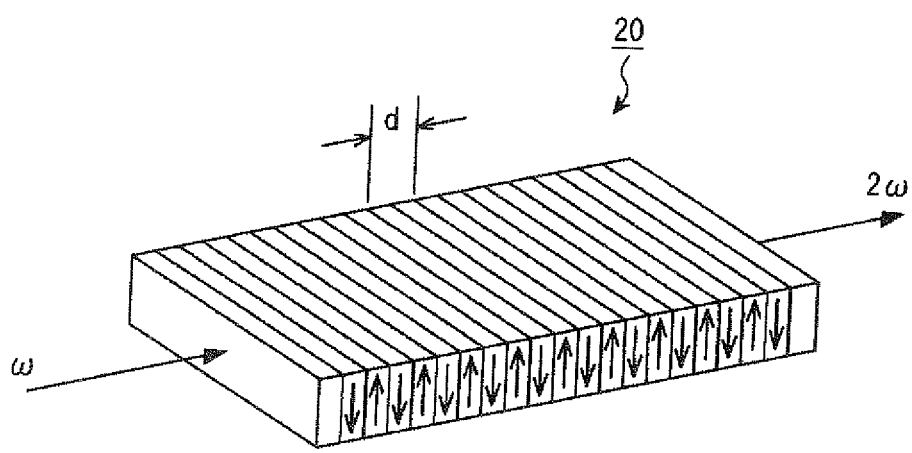
FIG. 1 is a schematic configuration diagram of a wavelength conversion element for generating second harmonic based on quasi-phase matching related to the present invention.

1: Crucible for growth
2: Heating unit
3: Seed crystal
4: Grown crystal
5: Raw material
6: High-temperature portion
7: Low-temperature portion
8: Growth orientation
9: Single crystal plate
10: Lower electrode film
11: Upper electrode film
11A: Linear electrode of the upper electrode film
11B: Opening of the upper electrode film
11C, 11D: Common wiring portion of the upper electrode film
14: High-voltage power supply
20, 25: Wavelength conversion element

BEST MODES FOR CARRYING OUT THE INVENTION

The embodiment of the present invention will hereinafter be described in detail by referring to the drawings.

The wavelength conversion element according to the present invention achieves quasi-phase matching by forming a periodic polarization reversal structure in a non-linear optical crystal, namely a nitride single crystal.

FIG. 1 is a schematic configuration diagram of a wavelength conversion element 20 for generating second harmonic based on quasi-phase matching.

A wavelength conversion element 20 is a nitride single crystal, which is a rectangular non-linear optical crystal. In the nitride single crystal, a periodic polarization reversal structure having period d expressed by equation (1) as shown below is formed. As shown in FIG. 1, the polarity is alternated in period d.

$$d = m\lambda / [2(n_{2\omega} - n_\omega)] \quad (1)$$

where, m represents the order of phase matching, λ represents the wavelength of the incident light, $n_\omega$ represents the refractive index of the nitride single crystal for the light having frequency of ω, and $n_{2\omega}$ represents the refractive index of the nitride single crystal for the light having frequency of 2ω.

As shown in FIG. 1, in the wavelength conversion element 20, when a light having given frequency ω is input from one of the end faces of the nitride single crystal having a periodic polarization reversal structure at an angle perpendicular to the boundary face of the periodic polarization reversal structure, a second harmonic 2ω light having frequency twice as high as that of the incident light is output from the other end face of the nitride single crystal, thus achieving wavelength conversion. In this case, when optical polishing is performed to both end faces of the nitride single crystal, and furthermore a film conforming to the wavelength of the light to be transmitted is formed to prevent reflection, the efficiency of wavelength conversion can be further enhanced. There is no limitation in the method of forming such a periodic polarization reversal structure. When the ordinary method of applying high voltage is used, a periodic polarization reversal structure can be formed easily on a nitride single crystal.

Figure 2:
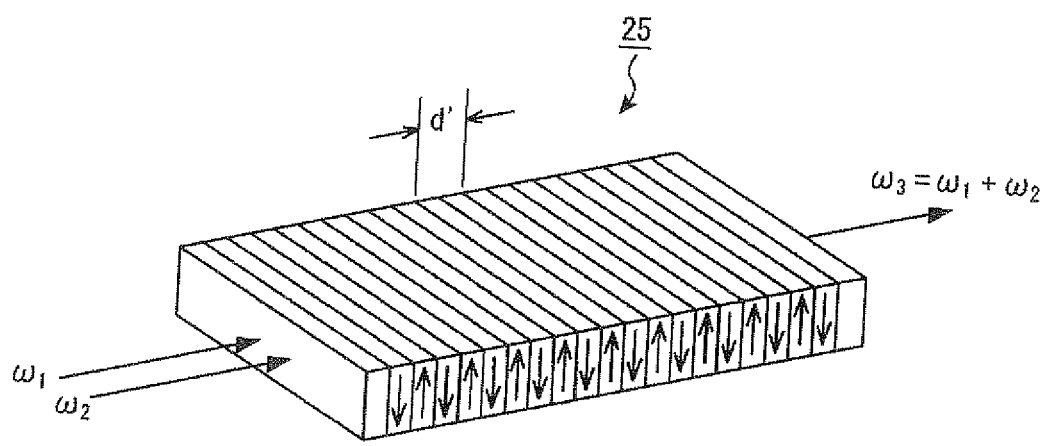
FIG. 2 illustrates the polarization reversal structure of the wavelength conversion element related to a variation of the present invention.

FIG. 2 illustrates the polarization reversal structure of a wavelength conversion element 25 related to a variation of the present invention.

By forming a periodic polarization reversal structure wherein the polarity is alternated in period d' found by equation (2) as shown below on a nitride single crystal, a wavelength conversion element 25 based on sum frequency generation using quasi-phase matching can also be structured.

$$d'=m/[(n_3/\lambda 3)-(n_2/\lambda 2)-(n_1/\lambda 1)] \quad (2)$$

where, m represents the order of phase matching, λ1, λ2, and λ3 represent the wavelengths of the beams of light having frequency of ω1, ω2, and ω3 respectively, and $n_1$, $n_2$, and $n_3$ represent the refractive index of the nitride single crystal for the beams of light having frequency of ω1, ω2, and ω3 respectively.

An AlN—GaN mixed crystal expressed by the chemical formula $Al_{1-x}Ga_xN$ (0≦x≦1) is preferably used as a nitride single crystal of the present invention constituting a non-linear optical crystalline structure. In particular, the use of AlN is effective at obtaining shorter wavelengths. A bulk crystal or a thin film formed on a substrate can be used as the form of the nitride single crystal. A thin film may be formed on a substrate made of Si, GaAs, AlN, InP, AlGaN, $Al_2O_3$, or β-$Ga_2O_3$. Furthermore, various methods applicable to producing a nitride single crystal to be used for the present invention include but not limited to the vapor phase growth method (sublimation method, organic metal vapor phase growth method, hydride vapor phase growth method, and molecular beam epitaxy method), liquid phase growth method, and solution growth method. These methods and growth conditions are only examples, and various others are applicable.

Example 1

The present invention will hereinafter be described in detail by referring to the Example, but the technical content is not limited to the description provided hereunder.

In this Example, the wavelength conversion element 20 was manufactured using an AlN single crystal grown by the sublimation method. The following description is provided only as a typical example of the present invention, and the embodiments of the present invention are not limited to the one described below.

Figure 3:
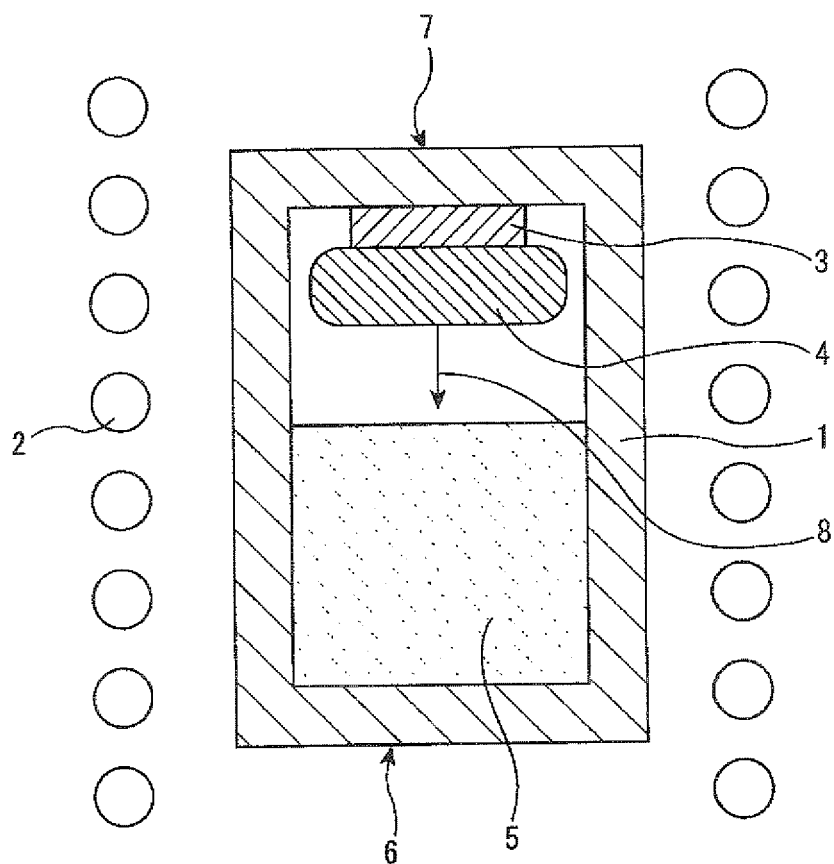
FIG. 3 is a schematic explanatory diagram illustrating the sublimation method of the Example.

FIG. 3 is a schematic explanatory diagram illustrating the sublimation method of the Example.

As shown in FIG. 3, a temperature distribution having high-temperature portion 6 and low-temperature portion 7 is created within a crucible for growth 1 using a heating unit 2, and a raw material 5 placed on the high-temperature portion 6 is sublimated and deposited on a seed crystal 3 placed on the low-temperature portion 7 to induce crystal growth 4.

In the sublimation method of the Example, high-frequency induction heating is adopted as a heating method, and the graphite crucible 1 having internal diameter (Φ) of 50 mm, height of 80 mm, and the thickness of 10 mm was set within a quartz container that can be performed to vacuum pumping and can supply high-purity nitrogen gas. On the side of the low-temperature portion 7 on the upper part of the graphite crucible 1, AlN single crystal substrate having a thickness of 1 mm and diameter of 25 mm, which had been mirror finished by chemical polishing and whose principal face orientation was face c, was set as the seed crystal 3.

AlN polycrystal powder was used as the raw material 5, and was placed on the side of the high-temperature portion 6 on the lower part of the graphite crucible 1. In a high-purity nitrogen atmosphere at 101 kPa, the temperature of the low-temperature portion containing the seed crystal 3 placed on the upper part of the graphite crucible 1 was set to 2200° C., whereas that of the high-temperature portion containing the raw material 5 placed on the bottom part of the graphite crucible 1 was set to 2250° C., by high-frequency induction heating. AlN single crystal was grown for 80 hours. After the growth was completed, the temperature was reduced to room temperature to obtain an AlN single crystal 4.

The AlN single crystal 4 obtained was in a cylindrical form having diameter of approximately 30 mm and thickness of approximately 10 mm. The AlN single crystal obtained was found to be a single crystal grown on surface c, having the growth orientation of the seed crystal 3, except for a part of the outer periphery of the crystal, where polycrystallization was found.

From the AlN single crystal 4 thus obtained, an AlN single crystal plate in desirable dimensions was cut out to fabricate the wavelength conversion element 20.

The wavelength conversion element 20 in this Example, the AlN single crystal plate with a periodic polarization reversal structure formed on it, allows positive/negative polarity to be alternated in period d expressed by formula (1), and on receiving 420 nm incident light (fundamental wave), outputs 210 nm light, which is a second harmonic, using quasi phase matching.

$$d=m\lambda/[2(n_{2\omega}-n_\omega)] \quad (1)$$

where, m represents the order of phase matching, λ represents the wavelength of the incident light (fundamental wave), $n_\omega$ represents the refractive index of the AlN single crystal 4 for the light having frequency of ω (fundamental wave), and $n_{2\omega}$ represents the refractive index of the AlN single crystal 4 for the light having frequency of 2ω (second harmonic).

In the present Example, the periodic polarization reversal structure was formed by utilizing the ferroelectricity of AlN. Specifically, by externally applying high electric field in the direction opposite to that of the c axis, which is the spontaneous polarization axis of the AlN, the polarity of its spontaneous polarization was reversed to form the polarization reversal structure.

First, the AlN single crystal 4 obtained was sliced perpendicular to the c axis to obtain a thin 10 mm×10 mm×0.5 mm AlN single crystal plate, whose thickness direction extended in the direction of the c axis. When the AlN single crystal plate is thinner, stronger electric field can be applied to the crystal during the process of fabricating the polarization reversal structure. However, it is desirable that the thickness of the AlN single crystal plate may be made larger than the diameter of the light beam to be entered as a fundamental wave. With these conditions taken into consideration, the ideal thickness of the AlN single crystal plate falls within the 0.5 mm to 1.0 mm range.

Electrodes having a periodic structure corresponding to the periodic polarization reversal structure to be formed were then formed on the (0001) face, which was perpendicular to the c axis of the thin AlN single crystal plate processed. It is only necessary to form an electrode having a periodic structure corresponding to the periodic polarization reversal structure to be formed on at least one of the upper and lower faces, namely the (0001) faces facing opposite to each other. The electrode to be formed on the other face may be uniform over the entire face. As a matter of course, electrodes having the same periodic structure may be formed on both faces.

Figure 4:
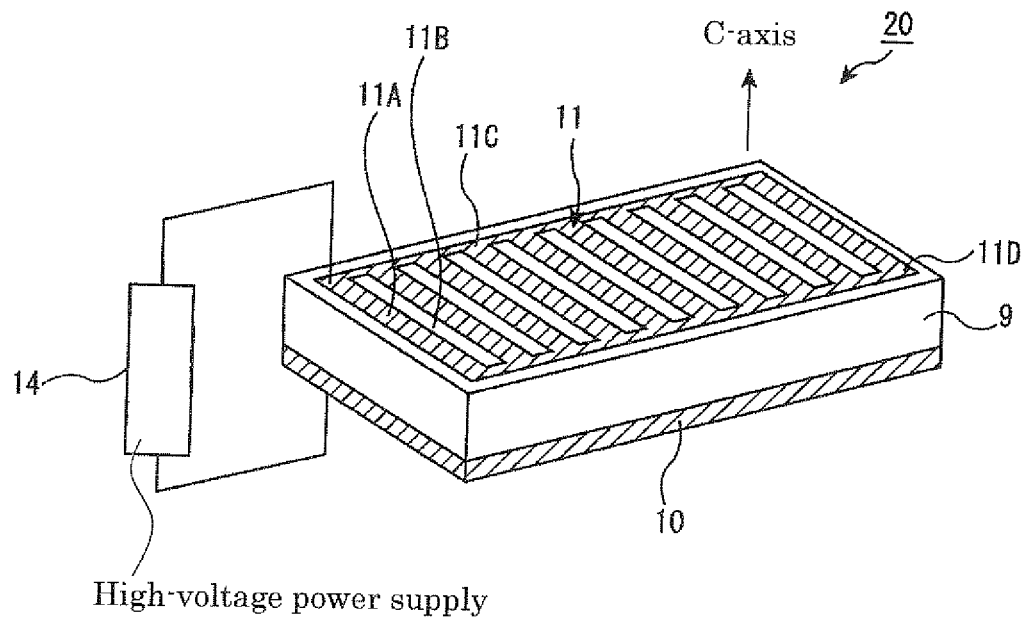
FIG. 4 is a schematic diagram illustrating the electrode pattern formed in the Example.

FIG. 4 is a schematic diagram illustrating the electrode pattern formed in the Example. As shown in FIG. 4, the uniform lower electrode film 10 was formed on the lower face, and the upper electrode film 11 having a periodic structure was formed on the upper face, of the AlN single crystal plate 9 respectively by the sputtering method.

Platinum was used as an electrode material. However, other metallic materials such as aluminum and nickel-chromium alloy can be used for the electrode films 10 and 11. The electrode films 10 and 11 can be formed not only by the sputtering method but also by conventional thin film formation methods such as vacuum deposition and ion plating methods. An appropriate method may be selected depending on the size of the element, materials of the electrode films 10 and 11, etc.

As a method for forming a periodic pattern on the electrode films 10 and 11, the photolithography technique, which is generally used for manufacturing semiconductor devices, was adopted. As shown in FIG. 4, the upper electrode film 11 is in a rectangular form, and comprises a portion having a periodic pattern wherein linear electrodes 11A and openings 11B are placed alternately, and common wiring portions 11C and 11D for connecting the linear electrodes 11A to one end of a high-voltage power supply 14. In the figure shown, the common wiring portions 11C and 11D are formed as linear portions connecting the upper and lower ends of each linear electrode 11A. The other end of the high-voltage power supply 14 is connected to the lower electrode film 10.

After the electrode film 11 having a desirable periodic structure was formed on the AlN single crystal plate 9, high voltage was applied to the electrode films 10 and 11 to reverse the spontaneous polarization of the relevant part. The voltage was adjusted within the range from several kV to 10 kV depending on the coercive electric field of the AlN single crystal plate 9 and the element thickness, and applied in pulses. The width of one pulse was defined as approximately several tens μs i.e. 10 μs to 200 μs. By monitoring the overall charge fed when electric field was applied, carrying out in-situ observation of polarization reversal, performing etching after the formation of the element, and observing the polarization reversal structure formed, the voltage to be applied and the application time per pulse were optimized.

Since the electric field to be applied at the time of polarization reversal stretches to some extent within the crystal, the length of the portion wherein polarization reversal occurs is not exactly the same as that of the electrodes after the processing. The length of the electrodes is normally set shorter than desired length of the polarization reversal portion. In the Example, the optimum length of the electrodes was found empirically, but optimum electrode length may be found by simulating the electric field intensity distribution within the crystal.

The polarization reversal structure formed on the AlN single crystal plate 9 is shown in FIG. 1. The arrows shown on both ends of the crystal indicate the polarization direction. In an actual polarization reversal process, the margin where the electrode films 10 and 11 are not formed is provided on the periphery of the AlN single crystal plate 9 to ensure insulation between the upper and the lower electrode films 10 and 11. Consequently, incomplete polarization reversal portion exists on the periphery of the AlN single crystal plate 9. Unsurprisingly, however, when the polarization reversal structure, in which polarization reversal is achieved in specified periods, is formed in a portion along the optical axis, the wavelength conversion element 20 can satisfy its function thoroughly.

INDUSTRIAL APPLICABILITY

The wavelength conversion element 20 and 25 according to the present invention forms an efficient deep-ultraviolet luminescent light source, achieving a downsized solid-state element and thus providing significant industrial applicability allowing more efficient use of deep ultraviolet rays.

What is claimed is:

1. A wavelength conversion element comprising a periodic polarization reversal structure formed in a non-linear optical crystal, wherein positive/negative polarity is alternated periodically in period d expressed by the following formula (1), the element outputting light having frequency of 2ω from an incident light having frequency of ω using quasi-phase matching, wherein the non-linear optical crystal is an AlN bulk single crystal:

$$d = m\lambda / [2(n_{2\omega} - n_\omega)] \qquad (1)$$

where, m represents the order of phase matching, λ represents the wavelength of the incident light, $n_\omega$ represents the refractive index of the AlN bulk single crystal for the light having frequency of ω, and $n_{2\omega}$ represents the refractive index of the AlN bulk single crystal for the light having frequency of 2ω.

2. A wavelength conversion element comprising a periodic polarization reversal structure formed in a non-linear optical crystal, wherein positive/negative polarity is alternated periodically in period d' expressed by the following formula (2), the element simultaneously inputting beams of light having frequency of ω1 and ω2 respectively and outputting light having frequency of ω3=ω1+ω2 using quasi-phase matching, wherein the non-linear optical crystal is an AlN bulk single crystal:

$$d' = m / [(n_3/\lambda 3) - (n_2/\lambda 2) - (n_1/\lambda 1)] \qquad (2)$$

where, m represents the order of phase matching, λ1, λ2, and λ3 represent the wavelengths of the beams of light having frequency of ω1, ω2, and ω3 respectively, and $n_1$, $n_2$, and $n_3$ represent the refractive index of the AlN bulk single crystal for the beams of light having frequency of ω1, ω2, and ω3 respectively.

3. The wavelength conversion element according to claim 1 or 2, characterized in that the AlN bulk single crystal is manufactured by the vapor phase growth method.

4. The wavelength conversion element according to claim 1 or 2, characterized in that the AlN bulk single crystal is manufactured by the liquid phase growth method or solution growth method.

5. The wavelength conversion element according to claim 1 or 2, characterized in that the wavelength of at least one of the beams of light to be output after wavelength conversion is 500 nm or shorter.

6. The wavelength conversion element according to claim 1 or 2, wherein the AlN bulk single crystal has a thickness within a range of 0.5 mm to 1.0 mm.

\* \* \* \* \*